(12) United States Patent
Kudo

(10) Patent No.: US 7,243,026 B2
(45) Date of Patent: Jul. 10, 2007

(54) VEHICLE TRAVELING CONTROL DEVICE

(75) Inventor: Shinya Kudo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 262 days.

(21) Appl. No.: 10/998,946

(22) Filed: Nov. 30, 2004

(65) Prior Publication Data

US 2005/0125155 A1    Jun. 9, 2005

(30) Foreign Application Priority Data

Dec. 5, 2003    (JP) .............. 2003-408326

(51) Int. Cl.
*G08G 1/16*    (2006.01)
(52) U.S. Cl. ............... 701/301; 701/96; 340/435; 340/436; 340/903
(58) Field of Classification Search ............... 701/96, 701/300–302; 340/425.5, 435–436, 903, 340/901; 342/29, 41; 180/232, 9.32
See application file for complete search history.

(56) References Cited

U.S. PATENT DOCUMENTS

| | | | |
|---|---|---|---|
| 6,138,062 A | 10/2000 | Usami et al. | |
| 6,625,540 B2* | 9/2003 | Kageyama | 701/301 |
| 2001/0018641 A1 | 8/2001 | Kenji et al. | |
| 2005/0128063 A1* | 6/2005 | Isaji et al. | 340/439 |

FOREIGN PATENT DOCUMENTS

| | | |
|---|---|---|
| DE | 100 12 737 A1 | 9/2001 |
| DE | 100 36 276 A1 | 2/2002 |
| JP | 59-111508 A | 6/1984 |
| JP | 07-81604 | 3/1995 |

* cited by examiner

*Primary Examiner*—Yonel Beaulieu
(74) *Attorney, Agent, or Firm*—McGinn IP Law Group, PLLC

(57) ABSTRACT

A control device sets avoidance traveling reaching points, avoidance traveling target points, and a final avoidance target point of an obstacle to be avoided based on the position of the obstacle to be avoided and the position of the vehicle for the target passing position based on obstacle information recognized by a stereo camera, and an environment recognition unit, inputs the target actual steering angle as a vehicle motion parameter obtained according to a vehicle motion model to an electric power steering control device with these target passing positions as a target, and guides the avoidance traveling. The increase of the number of operations is controlled thereby to a minimum, and the obstacle is smoothly, efficiently and stably avoided based on actual behavior of the vehicle.

18 Claims, 8 Drawing Sheets

VEHICLE TRAVELING CONTROL DEVICE

This application claims benefit of Japanese Application No. 2003-408326 filed on Dec. 5, 2003, the contents of which are incorporated by this reference.

BACKGROUND OF THE INVENTION

1. Field of the Invention

The present invention relates to a vehicle traveling control device to avoid an obstacle ahead of a vehicle.

2. Description of the Related Art

Recently, a traveling control device that detects the obstacle present on the traveling road ahead of a vehicle and guides the vehicle to avoid the obstacle in order to reduce driving strain on a driver and enhance the safety of the vehicle has been developed and put into practical use.

For example, Japanese Unexamined Patent Application Publication No. 7-81604 discloses a vehicle that drives automatically while recognizing the environment outside the vehicle and changes lane while avoiding the obstacle ahead of the vehicle. In the technology in which a target path to connect a target arrival position arrived at by avoiding the obstacle to the present position of the vehicle is set by a plurality of nodes to guide the vehicle.

However, in the processing of the target path disclosed in the Japanese Unexamined Patent Application Publication No. 7-81604, problems occur in that control is performed for each node, the number of operations is increased, delay occurs, and control cannot be performed smoothly. Even if the operation delay is corrected, another operation delay for the correction becomes large and cannot be neglected.

SUMMARY OF THE INVENTION

The present invention has been achieved in light of the above circumstances, and an object of the present invention is to provide a vehicle traveling control device capable of keeping an increase in the number of operations to a minimum, and capable of smoothly, efficiently and stably avoiding obstacles based on the actual behavior of the vehicle.

The vehicle traveling control device of the present invention comprises three-dimensional object detection means to detect a three-dimensional object in a traveling environment, obstacle recognition means to recognize an obstacle to form a traveling obstacle of the vehicle among the three-dimensional objects detected by the three-dimensional object detection means, and control means to guide the vehicle so as to turn around and avoid the obstacle recognized by the obstacle recognition means. The control means sets an avoidance traveling start point to start the avoidance traveling, an avoidance traveling reaching point on the obstacle side based on the position of the obstacle, and an avoidance traveling target point between the avoidance traveling start point and the avoidance traveling reaching point: sets vehicle motion parameters based on a vehicle motion model with the avoidance traveling target point and the avoidance traveling reaching point as target passing positions: and guides the vehicle so that the turning direction of the vehicle is switched to the opposite direction at the avoidance traveling target point with respect to the turning direction of the vehicle from the avoidance traveling start point to the avoidance traveling target point.

The above and other objects, features and advantages of the invention will become more clearly understood from the following description referring to the accompanying drawings.

DESCRIPTION OF THE PREFERRED EMBODIMENTS

An embodiment of the present invention will be described with reference to FIGS. 1 to 8D.

Figure 1:
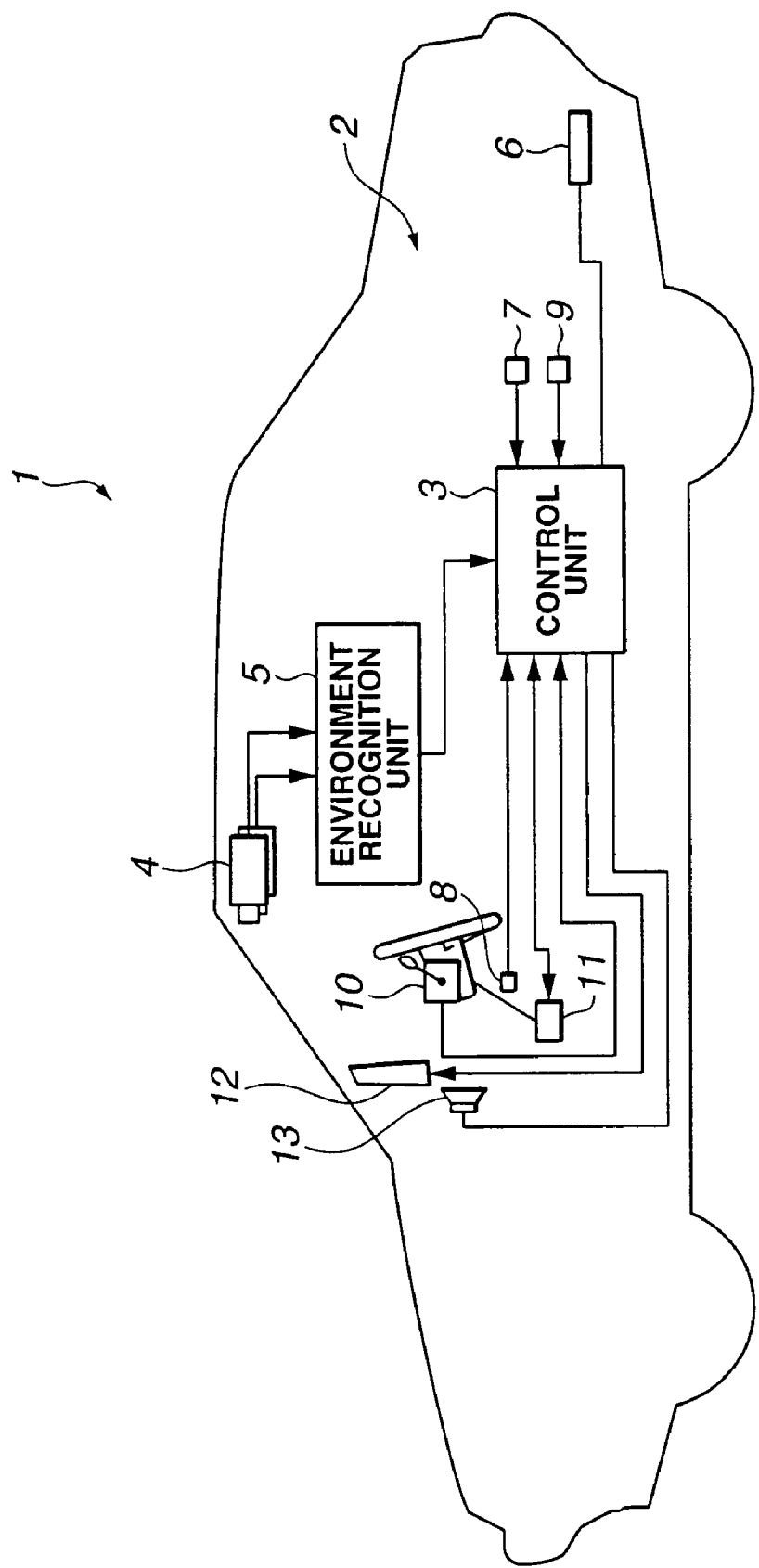
FIG. 1 is a schematic representation of the entire of a vehicle traveling control device.
Figure 2:
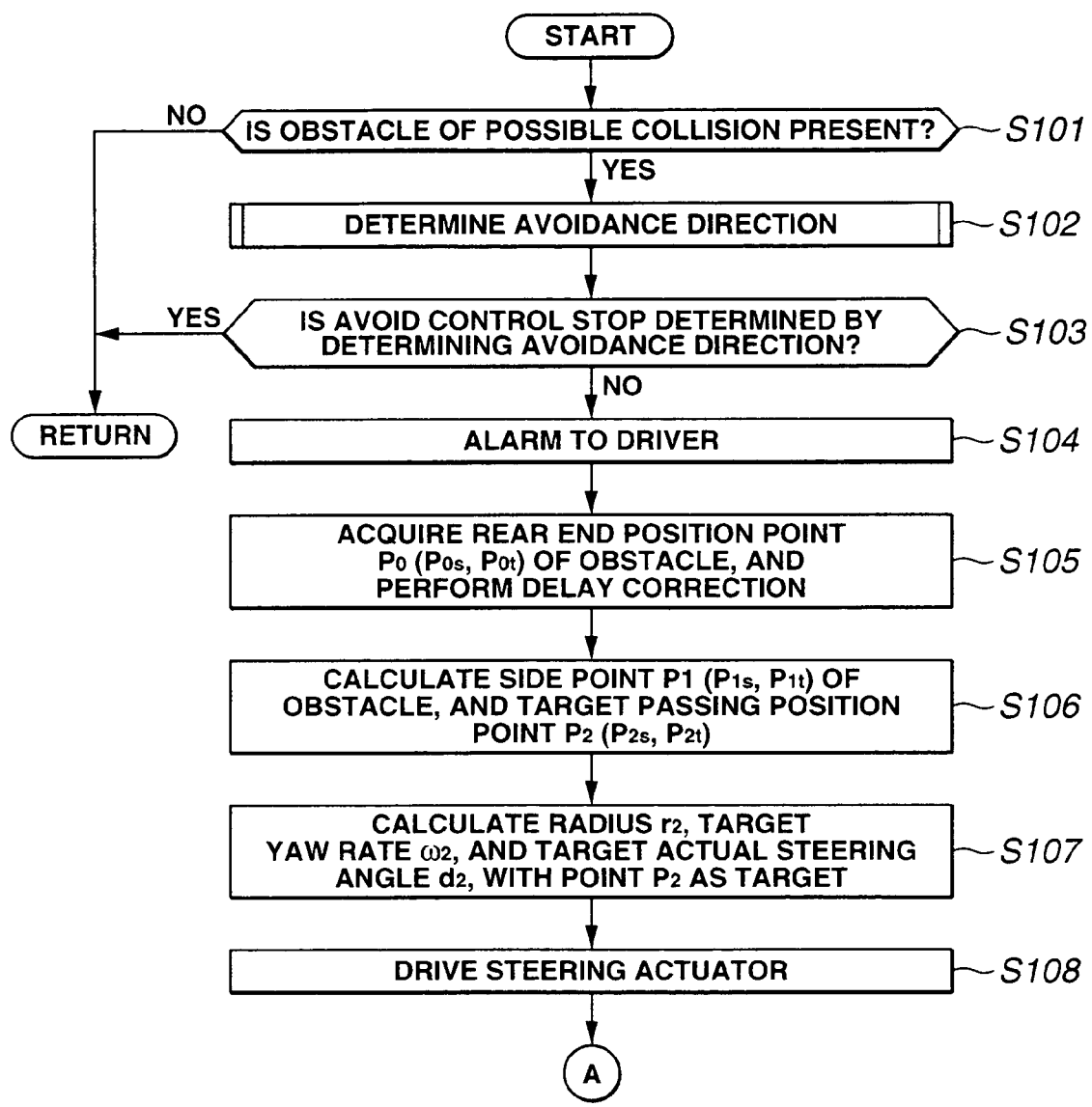
FIG. 2 is a flowchart of an avoidance traveling control program.
Figure 3:
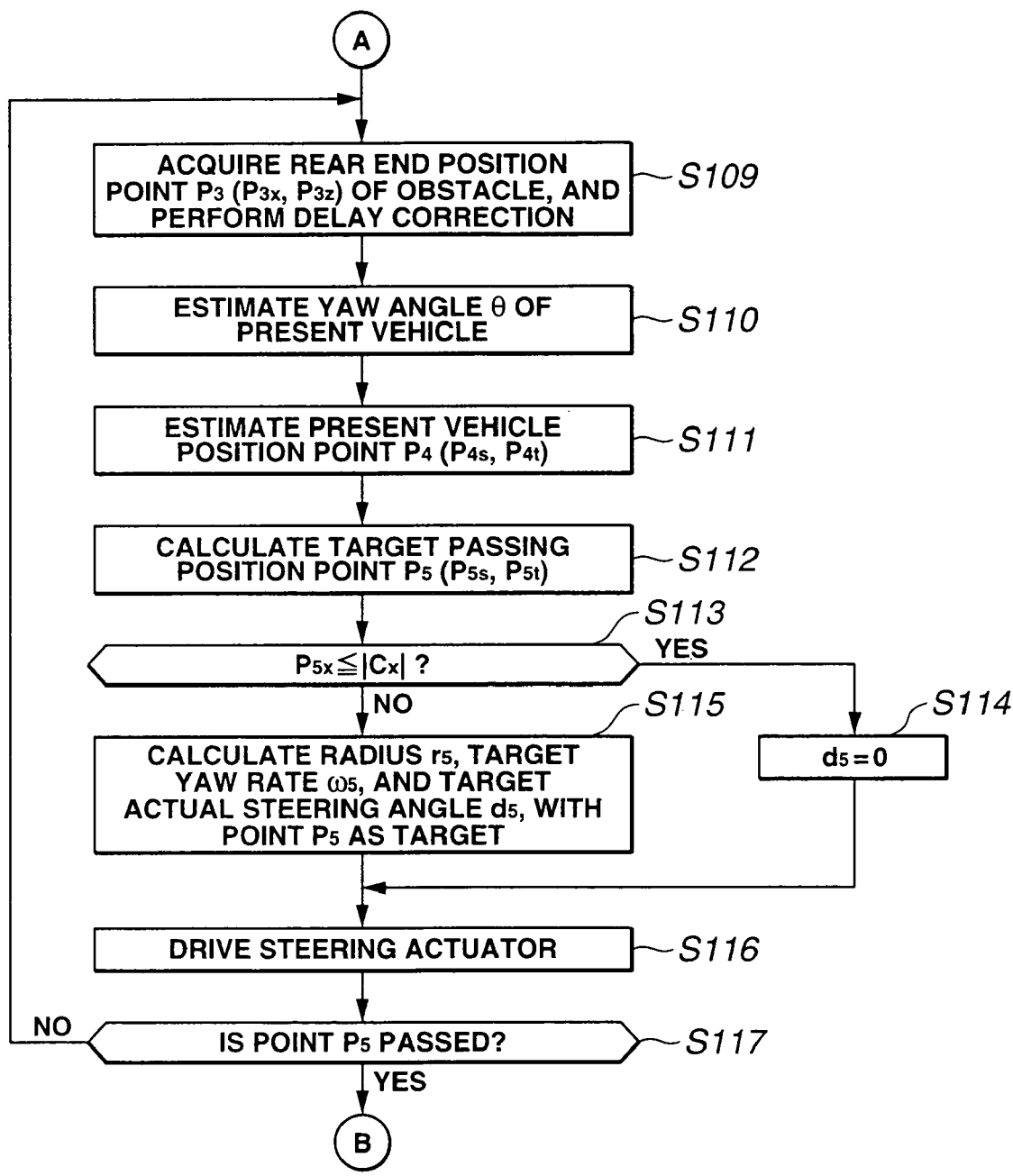
FIG. 3 is the flowchart following FIG. 2.
Figure 4:
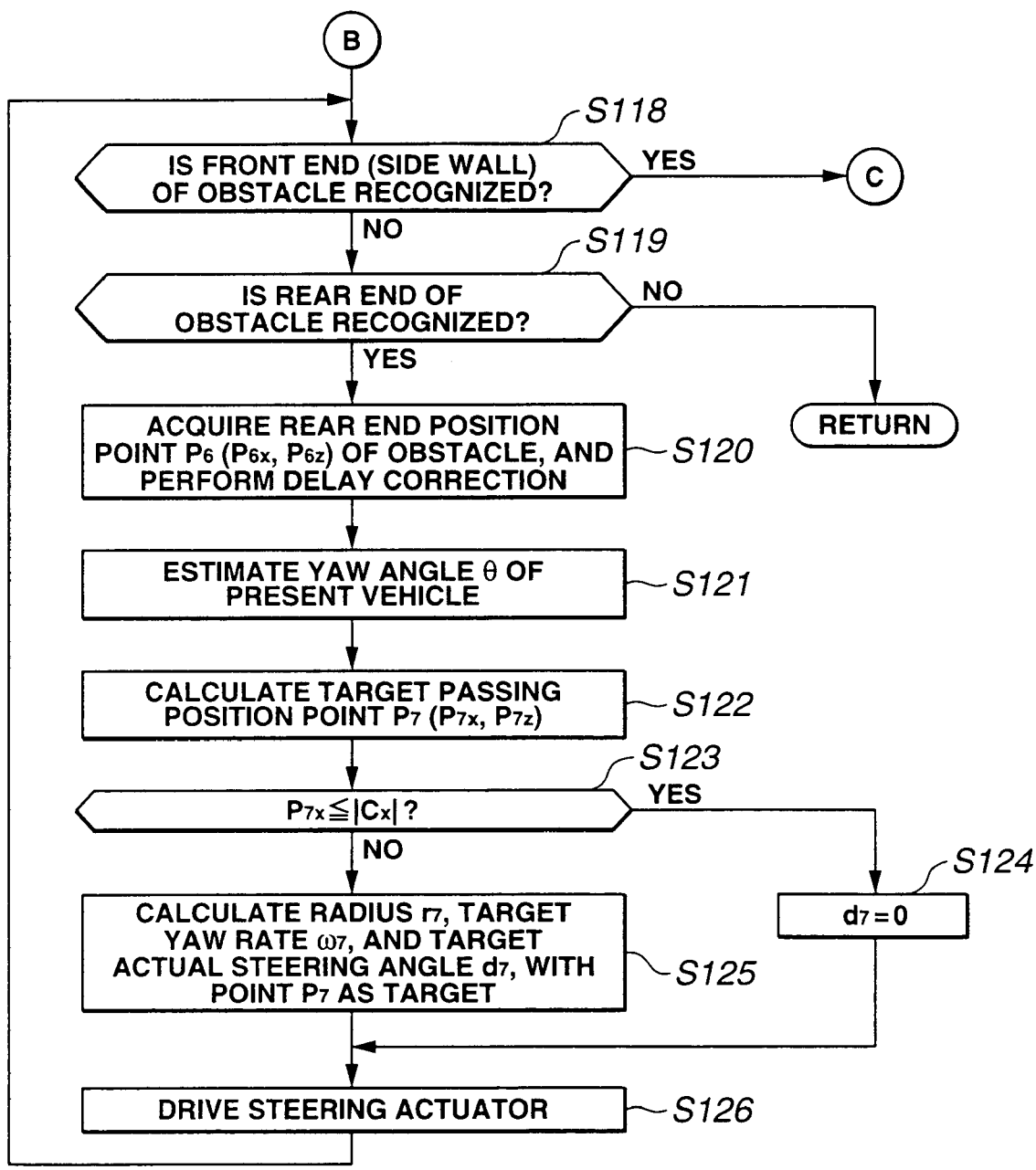
FIG. 4 is the flowchart following FIG. 3.
Figure 5:
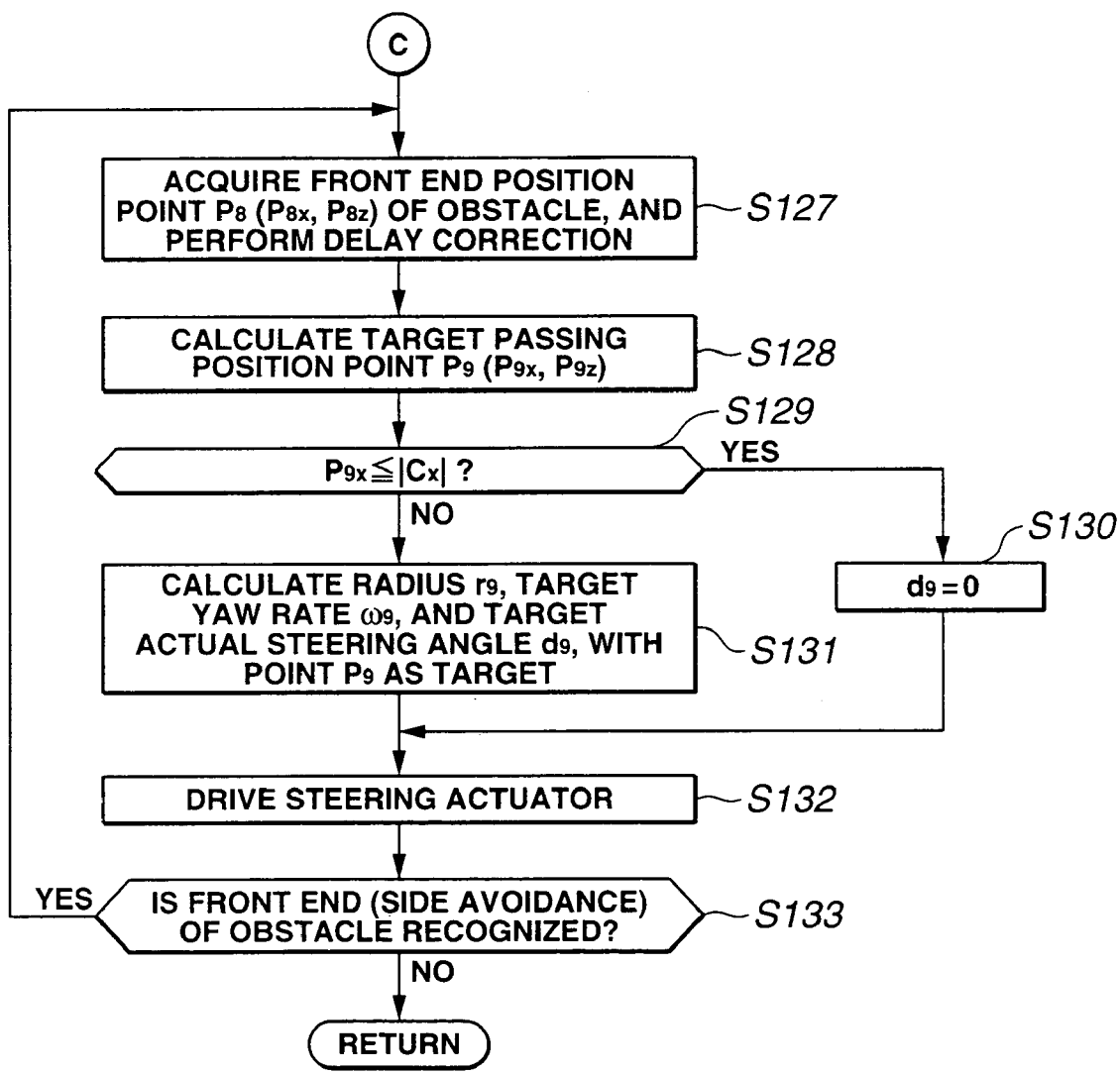
FIG. 5 is the flowchart following FIG. 4.

In FIG. 1, reference numeral 1 denotes a vehicle (an own vehicle) such as an automobile, and a traveling control device 2 is mounted on the vehicle 1. In the traveling control device 2, an environment recognition unit 5 functioning as a three-dimensional object detection device and an obstacle recognition device, and a laser radar device 6 which is also the three-dimensional object detection device to detect obstacles approaching from both sides at the rear of the vehicle 1 are connected to a control device 3 serving as a control device described below. The environment recognition unit 5 recognizes the forward road environment based on the images picked up by stereo cameras 4, and inputs white lane information on the road and obstacle information to the control device 3.

Further, sensors such as a vehicle speed sensor 7, a steering wheel angle sensor 8, and a yaw rate sensor 9 are connected to the control device 3, and a switch 10 to turn on/turn off the avoidance traveling control and switches such as a brake pedal switch and an accelerator pedal switch (both not shown) are also connected to the control device 3.

When the control device 3 recognizes the obstacle by following an avoidance traveling control program described below based on these sensors, the control device 3 controls the traveling path based on the position of the vehicle 1 and the obstacle position, and outputs the signal to an electric power steering control device 11 which is a steering actuator. Further, the control device 3 achieves avoidance control by the automatic steering, and guides the vehicle 1.

Furthermore, the control device 3 displays the forward environment, the position of the obstacle, the operation condition of the avoidance traveling control, or the like on a liquid crystal display 12 provided on a dashboard, for example. Still further, the control device 3 informs a driver of the presence of a possibly colliding obstacle ahead as well as the operating state of the avoidance traveling control, by announcing audio explanation from a speaker 13.

The stereo camera 4 comprises one set of (right and left) CCD cameras using a solid-state image pickup element, such as a charge coupled device (CCD), for the stereo optical system, and these right and left CCD cameras are fitted to a forward part of a ceiling in the cabin with a predetermined spacing therebetween, and perform stereo image pickup of objects outside the vehicle from different viewpoints and input the picked-up image to the environment recognition unit 5.

Images from the stereo camera 4 are processed in the environment recognition unit 5 as follows, for example. Firstly, distance information over the entire image is obtained by the principle of triangulation from the deviation of the corresponding position with respect to one set of stereo image pairs of the environment in the advancing direction of the vehicle picked up by the CCD cameras of the stereo camera 4, and a distance image to indicate the three-dimensional distance distribution is generated. The data is compared with known group-processed and pre-stored three-dimensional road shape data, side wall data, three-dimensional object data or the like. White lane data, side wall data such as the guard rail present along the roads and curves, and the three-dimensional object data, such as vehicles and pedestrians, are extracted. Different numbers are allotted to each of the thus-extracted white lane data, side wall data, and three-dimensional object data. Further, the three-dimensional object data is classified into a mobile object in the backward direction which moves toward the vehicle 1 (in particular, an oncoming vehicle), a stationary object which does not move, and a mobile object in the forward direction which moves substantially in the same direction as the vehicle from the relationship of the relative change of the distance from the vehicle 1 and the vehicle speed of the vehicle 1. Among these three-dimensional objects, regarding the three-dimensional object that is present on the expected path of the vehicle 1 (a predetermined forward area with the present position of the vehicle 1 as a reference), and closest to the vehicle 1, the distance from the vehicle 1 to the obstacle, the relative speed, and the position on the road are output to the control device 3 as obstacle information.

On the other hand, the laser radar device 6 is a known device, and comprises a laser beam projecting unit equipped with a laser head having a laser beam projection/reception function and a right-to-left scanning function, and a signal processing unit that receives the signal from the laser beam projecting unit detects the approach of the obstacle from both sides at the rear of the vehicle 1 and outputs the result to the control device 3.

Next, the avoidance traveling control program to be executed by the control device 3 will be described in detail with reference to the flowcharts in FIGS. 2 to 5. The avoidance traveling control is performed when the switch 10 is turned ON, and is not performed when the switch 10 is turned OFF. Further, if the switch 10 is turned OFF during controlling, or a brake pedal switch or an accelerator pedal switch is turned ON (if the brake pedal or the accelerator pedal is depressed), the control is interrupted and reset.

Firstly, in Step (hereinafter, referred to as "S") 101, it is determined whether or not a possibly colliding obstacle is present based on obstacle information from the environment recognition unit 5. If no possibly colliding obstacle is present, the program is exited. If a possibly colliding obstacle is present, the program advances to S102. The presence of a possibly colliding obstacle is determined by the distance between the vehicle 1 and the obstacle, and the relative speed between the vehicle 1 and the obstacle. For example, when the vehicle is traveling at 50 km/h, it is determined that the vehicle may possibly collide with the obstacle if the obstacle does not move at a distance less than 50 m. When traveling at 80 km/h, it is determined that the vehicle may possibly collide with the obstacle if the obstacle exists at a distance less than 80 m.

In S102, it is determined avoiding direction for the obstacle (whether the vehicle avoid the obstacle at the right side or at the left side), or whether the avoidance control is stopped according to an avoiding direction determination routine which will be described below.

Then, the program advances to S103. As a result of the avoiding direction determination in S102, it is determined whether or not the avoidance control is stopped. If it is determined that the avoidance control is stopped, the program is exited. If it is not determined that the avoidance control is stopped, the program advances to S104, and an alarm is issued on the liquid crystal display 12 and from the speaker 13 that the obstacle to be avoided is present ahead, and the vehicle transfers to the avoidance traveling.

Figure 8A:
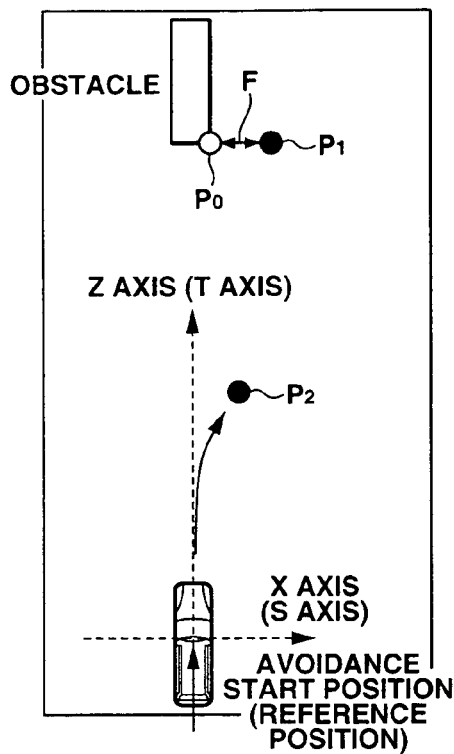
FIG. 8A is the schematic representation of an example of acquiring the rear end position on the side in which the obstacle is avoided in S105.

Next, the program advances to S105, and acquires the rear end position on the side where the obstacle to be avoided, in other words, Point P0 ($P0_s$, $P0_t$), from obstacle position information obtained from the environment recognition unit 5. Refer to FIG. 8A. Hereinafter, FIGS. 8A–8D show an example where the avoiding direction is set at the right side of the obstacle. In addition, suffixes "s" and "t" of the coordinates of Point P0 denote the coordinates of the coordinate system at the time when starting the avoidance traveling control; in other words, the suffixes denote the coordinates of an absolute coordinate system in which the substantial center of the stereo camera 4 is defined as an origin (an avoidance traveling start point) at this time, the longitudinal direction of the vehicle 1 is the T-axis, and the vehicle width direction thereof is the S-axis (similarly, hereinafter).

After acquiring P0 ($P0_s$, $P0_t$), time delay correction is performed for this P0 ($P0_s$, $P0_t$). In this delay correction, the actual traveling locus for the time delay of the obstacle position (for the time delay in transmission and calculation before the images of the actual obstacle position are picked up through the stereo camera 4, processed by the environment recognition unit 5, and output to the control device 3) is estimated from the vehicle speed v from the vehicle speed sensor 7 and the yaw rate ($d\theta/dt$) from the yaw rate sensor 9, and the obstacle position based on the position of the vehicle 1 is again estimated and calculated.

Figure 7:
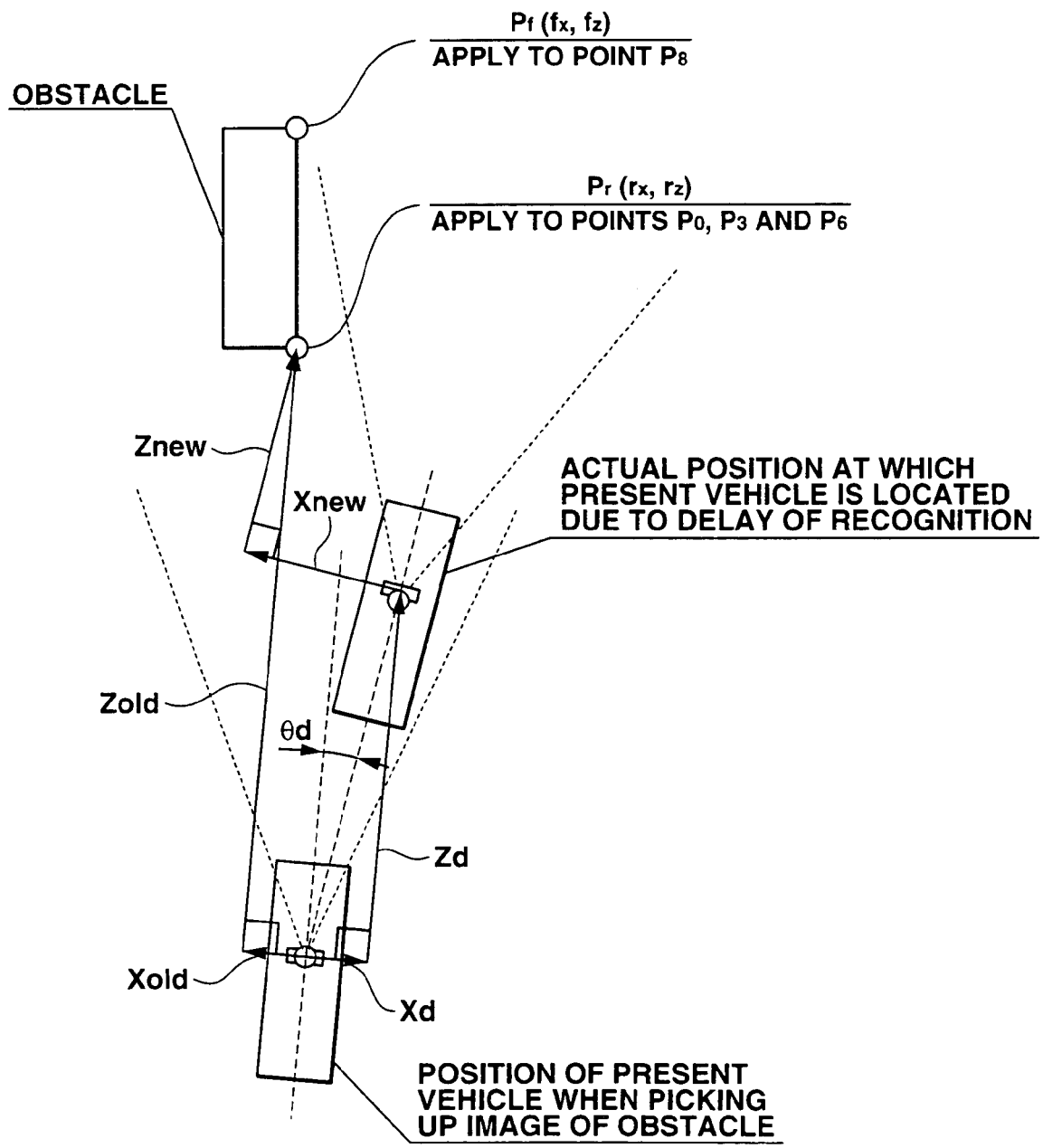
FIG. 7 is the schematic representation of recognition delay correction.

This correction is performed assuming that the traveling locus from the position of the vehicle 1 when the images of the obstacle are picked up to the actual position of the vehicle 1 forms a constant-speed and regular circular turn with respect to the sensor values detected when the vehicle 1 arrives at the actual position. More specifically, as shown in FIG. 7, it is assumed that the vehicle forms the regular circular turn with respect to the actual position from the position of the vehicle 1 when the images of the obstacle are picked up. The time delay correction is performed assuming that the obstacle position at the time of picking up the images of the obstacle is obtained based on these images when the vehicle 1 arrives at the actual position of the vehicle 1 due to the recognition delay.

Firstly, the yaw angle change θd of the vehicle 1 corresponding to the delay is calculated by the formula (1).

$$\theta d = (d\theta/dt) \cdot td \qquad (1)$$

where, td is the recognition delay time (sec), which is set to, for example, 0.2 to 0.3.

Next, the lateral acceleration ($d^2x/dt^2$) (m/sec$^2$) of the vehicle 1 is calculated by the formula (2).

$$(d^2x/dt^2)=(d\theta/dt)\cdot v \tag{2}$$

Next, the lateral change xd (m) corresponding to the time delay is calculated by the formula (3).

$$xd=\int\int(d^2x/dt^2)dt^2=(1/2)\,(d^2x/dt^2)\cdot td^2 \tag{3}$$

Next, the longitudinal position change zd(m) of the time delay is approximated and calculated by the formula (4).

$$zd=v\cdot td \tag{4}$$

Next, the three-dimensional object position Xnew after time delay correction is calculated by the geometrical coordinates conversion formula (5).

$$X\text{new}=(X\text{old}-xd)\cdot\cos\theta d+(zd-Z\text{old})\cdot\sin\theta d \tag{5}$$

where, Xold is the three-dimensional object position before correction (the X-coordinate value), and Zold is the three-dimensional object position before correction (the Z-coordinate value).

Next, the three-dimensional object position Znew after delay correction is calculated by the geometrical coordinates conversion formula (6).

$$Z\text{new}=(X\text{old}-xd)\cdot\sin\theta d+(Z\text{old}-zd)\cdot\cos\theta d \tag{6}$$

In other words, new $P0_s$ and $P0_t$ are calculated by substituting $P0_s$ and $P0_t$ of the point $P0(P0_s, P0_t)$ for Xold and Zold, respectively, in the above formulae (5) and (6).

After S105, the program advances to S106 and calculates Point P1 (P1s, P1t) with a predetermined distance F to the side of the obstacle, and the avoidance traveling target point P2 (P2s, P2t) as a target passing position. Point P2 is set at a center between Point P1 and the avoidance traveling start point. In other words, the coordinates of Point P1 and Point P2 are calculated by the formulae (7), (8), (9) and (10).

$$P1_s=P0_s+F \tag{7}$$

where, F is a constant (e.g., 2 m).

$$P1_t=P0_t \tag{8}$$

$$P2_s=(P0_s+F)/2 \tag{9}$$

$$P2_t=P0_t/2 \tag{10}$$

Next, the program advances to S107, and calculates the radius r2 by the formula (11), assuming that the passing locus to Point P2 is an arc. The sign (−) denotes the radius (absolute value) during the steering wheel turn to the left.

$$r2=(P2_s^2+P2_t^2)/(2\cdot P2_s) \tag{11}$$

The target yaw rate ω2 is calculated by the formula (12).

$$\omega 2=v/r2 \tag{12}$$

In addition, the target actual steering angle d2 is calculated by the formula (13) based on a first-order lag motion model of the vehicle.

$$d2=(1/G0)\cdot\omega 2+(1/G0)\cdot Tr\cdot(d\omega 2/dt) \tag{13}$$

where, G0 is a steady-state yaw rate gain, and given by the formula (14).

$$G0=(1/(1+sf\cdot v^2))\cdot(v/L) \tag{14}$$

sf is a stability factor, and L is a wheel base.
Tr is a time constant, and given by the formula (15).

$$Tr=(m\cdot lf\cdot v)/(2\cdot L\cdot kre) \tag{15}$$

where, m is the vehicle mass, lf is the distance between a front axle and the center of gravity, and kre is a rear cornering power.

Next, the program advances to S108. The signal is output to the electric power steering control device 11, and the vehicle 1 is guided by realizing the target actual steering angle d2 calculated in S107 by known PID control or the like using the output signal from the steering wheel angle sensor 8 as the feedback value.

Figure 8B:
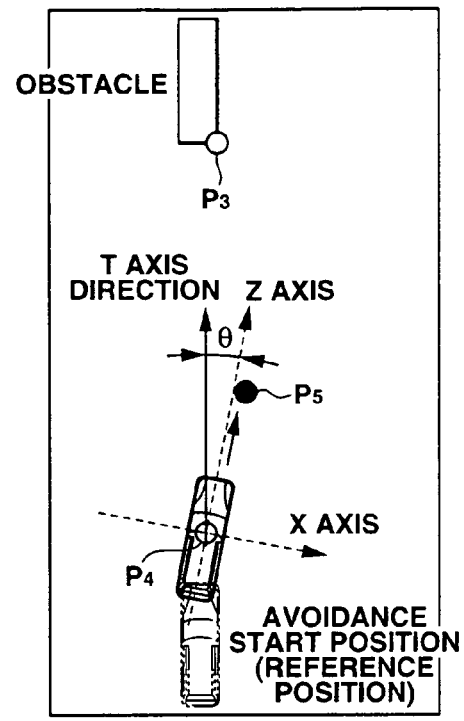
FIG. 8B is the schematic representation of an example of acquiring the rear end position on the side in which the obstacle is avoided in S109.

Thereafter, the program advances to S109, and acquires the rear end position on the obstacle avoidance side, in other words, acquires Point $P3(P3_x, P3_z)$ from obstacle position information from the environment recognition unit 5 (refer to FIG. 8B). In addition, the suffixes "x" and "z" of the coordinates of Point P3 indicate that the coordinates are different from the absolute coordinates of the S-T axis explained in S105, but the coordinates of the system with the vehicle as a reference in which a substantial center of the stereo camera 4 is an origin, the longitudinal direction of the vehicle 1 is the Z-axis, and the vehicle width direction is the X-axis (similarly, hereinafter).

After acquiring P3 ($P3_x$, $P3_z$), the time delay correction is performed. As described in S105, in the delay correction, the actual traveling locus for the time delay of the obstacle position (the delay in transmission and calculation before the image of the actual obstacle position is picked up through the stereo camera 4, processed by the environment recognition unit 5, and output to the control device 3), is estimated from the vehicle speed v from the vehicle speed sensor 7, and the yaw rate (dθ/dt) from the yaw rate sensor 9, and the obstacle position based on the vehicle 1 is again estimated and calculated. In other words, new $P3_x$ and $P3_z$ are calculated by substituting $P3_x$ and $P3_z$ of Point P3 ($P3_x$, $P3_z$) for Xold and Zold, respectively, in the formulae (5) and (6).

Next, the program advances to S110, the yaw angle θ of the vehicle 1 with the absolute coordinates of S-T axis as a reference is estimated by integrating the yaw rate (dθ/dt) from the yaw rate sensor 9.

Next, the program advances to S111, and the position P4 ($P4_s$, $P4_t$) of the vehicle 1 on the absolute coordinates of S-T axis is calculated based on P3 ($P3_x$, $P3_z$) obtained in S109 and the yaw angle θ of the vehicle 1 estimated in S110 by the formulae (16) and (17).

$$P4_s=P0_s-P3_x\cdot\cos\theta-P3_z\cdot\sin\theta \tag{16}$$

$$P4_t=P0_t+P3_x\cdot\sin\theta-P3_z\cdot\cos\theta \tag{17}$$

Next, the program advances to S112, and a new avoidance traveling target point $P5(P5_x, P5_z)$ is calculated as the target passing position. The coordinates of Point P5 are calculated by the formulae (18) and (19). Point P5 corresponds to Point P2.

$$P5_x=(P2_s-P4_s)\cdot\cos\theta+(P4_t-P2_t)\cdot\sin\theta \tag{18}$$

$$P5_z=(P2_s-P4_s)\cdot\sin\theta+(P2_t-P4_t)\cdot\cos\theta \tag{19}$$

Next, the program advances to S113, and the coordinate value $P5_x$ of Point P5 is compared with the absolute value of the preset value Cx (for example, 0.2 m or 0.5 m). As a result of comparison, the program advances to S114 if $P5_x\leq|Cx|$, the target actual steering angle d5 is set to be 0, and the program advances to S116. In other words, this is performed in order to effectively prevent possibility of contact with the obstacle because a large target actual steering angle d5 is calculated though the distance from a vehicle front surface and the target position is small when the target position approaches too closely.

On the contrary, as a result of comparison in S113, if $P5_x > |Cx|$, the program advances to S115, and calculates the radius r5, the target yaw rate ω5, and the target actual steering angle d5 with Point P5 as a reference by using the formulae described in S107.

$$r5 = (P5_x^2 + P5_z^2)/(2 \cdot P5_z) \quad (20)$$

$$\omega 5 = v/r5 \quad (21)$$

$$d5 = (1/G0) \cdot \omega 5 + (1/G0) \cdot Tr \cdot (d\, \omega 5/dt) \quad (22)$$

The program completes processing in S114 or S115, and advances to S116. The signal is output to the electric power steering control device 11, and the vehicle 1 is guided by realizing the target actual steering angle d5 calculated in S114 or S115 by the known PID control or the like using the output signal from the steering wheel angle sensor 8 as the feedback value.

Next, the program advances to S117, and it is determined whether or not the vehicle 1 passes through Point P5. If the vehicle does not pass the point, repeat the processing from S109. If the vehicle passes the point, the program advances to S118.

In S118, it is determined whether or not a front end (a side wall) of the obstacle is recognized. If recognized, jump to S127. If not recognized, the program advances to S119.

As a result of determination in S118, if the front end (the side wall) of the obstacle is not recognized, the program advances to S119, and it is determined whether or not a rear end of the obstacle is recognized. As a result of determination, if the rear end of the obstacle is not recognized, the program is exited. If the rear end of the obstacle is recognized, the program advances to S120.

Figure 8C:
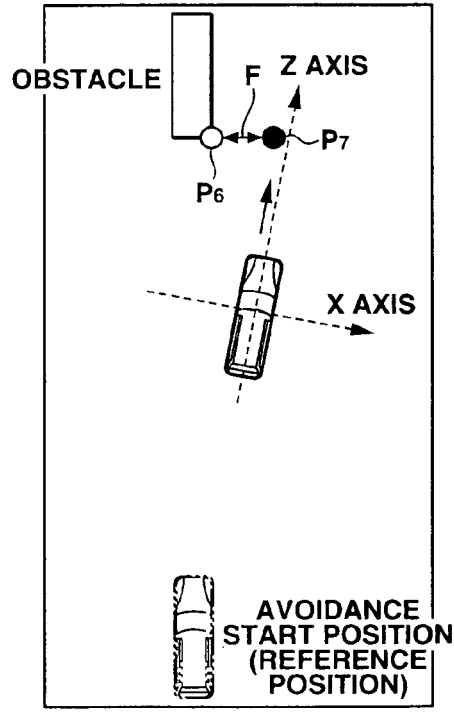
FIG. 8C is the schematic representation of an example of acquiring the rear end position on the side in which the obstacle is avoided in S120.
Figure 8D:
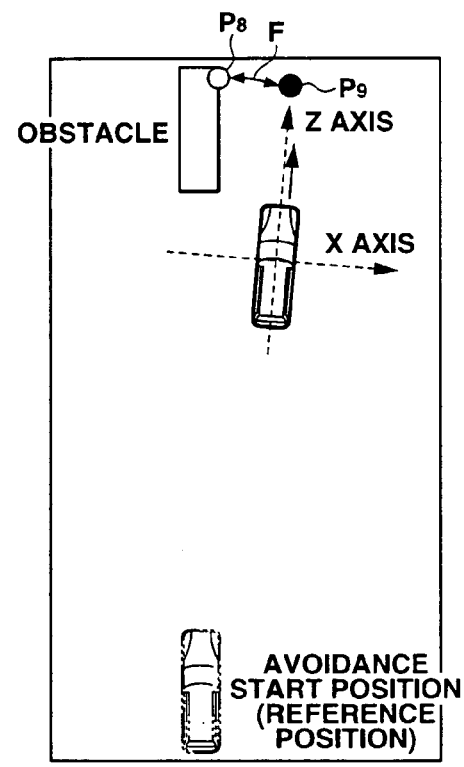
FIG. 8D is the schematic representation of an example of acquiring the front end position on the side in which the obstacle is avoided in S127.

The program advances to S120, and acquires the rear end position on the obstacle avoidance side, in other words, Point P6($P6_x$, $P6_z$) from obstacle position information from the environment recognition unit 5 (refer to FIG. 8C).

After acquiring Point P6($P6_x$, $P6_z$), perform the time delay correction. In this delay correction, as described in S105, the actual traveling locus for the time delay of the obstacle position (the delay of transmission and calculation before the image of the actual obstacle position is picked up through the stereo camera 4, processed by the environment recognition unit 5, and output to the control device 3) is estimated from the vehicle speed v from the vehicle speed sensor 7 and the yaw rate (dθ/dt) of the yaw rate sensor 9, and the obstacle position based on the position of the vehicle 1 is again estimated and calculated. In other words, new $P6_x$ and $P6_z$ are calculated by substituting $P6_x$ and $P6_z$ of Point P6($P6_x$, $P6_z$) for Xold and Zold, respectively, in the formulae (5) and (6).

Next, the program advances to S121, and the yaw angle θ of the vehicle 1 is estimated by integrating the yaw rate (dθ/dt) from the yaw rate sensor 9.

Next, the program advances to S122, the avoidance traveling reaching point P7($P7_x$, $P7_z$) is calculated as the target passing position by the formulae (23) and (24) from Point P6($P6_x$, $P6_z$) obtained in S120 and the yaw angle θ of the vehicle 1 estimated in S121. Point P7 corresponds to Point P1.

$$P7_x = F \cdot \cos\theta + P6_x \quad (23)$$

$$P7_z = F \cdot \sin\theta + P6_z \quad (24)$$

Next, the program advances to S123, and compares the coordinate value $P7_x$ of Point P7 with the absolute value of the preset value Cx (for example, 0.2 m or 0.5 m). As a result of comparison, if $P7_x \leq |Cx|$, the program advances to S124, set the target actual steering angle d7 to be 0, and the program advances to S126. In other words, similar to the above S113 and S114, this is performed in order to effectively prevent possibility of contact with the obstacle because a large target actual steering angle d7 is calculated though the distance from the vehicle front surface and the target position is small when the target position approaches too closely.

On the contrary, as a result of comparison in S123, if $P7_x > |Cx|$, the program advances to S125, and calculates the radius r7, the target yaw rate ω7, and the target actual steering angle d7 with Point P7 as target using the formulae described in S107. In other words, $$r7 = (P7_x^2 + P7_z^2)/(2 \cdot P7_z) \quad (25)$$

$$\omega 7 = v/r7 \quad (26)$$

$$d7 = (1/G0) \cdot \omega 7 + (1/G0) \cdot Tr \cdot (d\, \omega 7/dt) \quad (27)$$

The program completes processing in S124 or S125, and advances to S126. The signal is output to the electric power steering control device 11, and the vehicle 1 is guided by realizing the target actual steering angle d7 calculated in S124 or S125 by the known PID control or the like using the output signal from the steering wheel angle sensor 8 as the feedback value, and return to S118.

As described above, the vehicle 1 is guided by setting the turning direction of the vehicle 1 in the direction of leaving away from the obstacle with the avoidance traveling target point P2 or P5 as the target passing position in S107 and S116, and if Point P2 or Point P5 is passed, the vehicle 1 is guide by switching the steering direction of the vehicle 1 to the opposite direction in S126. In other words, Point P2 or Point P5 is a point at which the turning direction of the vehicle 1 is switched to the opposite direction with respect to the turning direction of the vehicle 1 from the avoidance traveling start point to Point P2 or Point P5.

On the other hand, the front end (the side wall) of the obstacle is recognized in S118, and the program advances to S127. The program acquires the front end position on the obstacle avoidance side, in other words, Point P8($P8_x$, $P8_z$) from obstacle position information from the environment recognition unit 5 (refer to FIG. 8D).

After acquiring Point P8 ($P8_x$, $P8_z$), perform the time delay correction. In the delay correction, as described in S105, the actual traveling locus for the time delay of the obstacle position (the delay of transmission and calculation before the image of the actual obstacle position is picked up through the stereo camera 4, processed by the environment recognition unit 5, and output to the control device 3) is estimated from the vehicle speed v from the vehicle speed sensor 7 and the yaw rate (dθ/dt) of the yaw rate sensor 9, and the obstacle position based on the position of the vehicle 1 is again estimated and calculated. In other words, new $P8_x$ and $P8_z$ are calculated by substituting $P8_x$ and $P8_z$ of Point P8($P8_x$, $P8_z$) for Xold and Zold, respectively, in the formulae (5) and (6).

Next, the program advances to S128, and calculates the final avoidance target point P9($P9_x$, $P9_z$) as the target passing position. The coordinates of Point P9 are calculated by the formulae (28) and (29) below.

$$P9_x = P8_x + F \quad (28)$$

$$P9_z = P8_z \quad (29)$$

Next, the program advances to S129, and compares the coordinate value $P9_x$ of Point P9 with the absolute value of the preset value Cx (for example, 0.2 m or 0.5 m). As a result of comparison, if $P9_x<|Cx|$, the program advances to S130, set the target actual steering angle d9 to be 0, and the program advances to S132. In other words, similar to the above S113 and S114, this is performed in order to effectively prevent possibility of contact with the obstacle because a large target actual steering angle d9 is calculated though the distance from the vehicle front surface and the target position is small when the target position approaches too closely.

On the contrary, as a result of comparison in S129, if $P9_x>|Cx|$, the program advances to S131, and calculates the radius r9, the target yaw rate ω9, and the target actual steering angle d9 with Point P9 as target using the formulae described in S107. In other words, $$r9=(P9_x^2+P9_z^2)/(2 \cdot P9_z) \qquad (30)$$

$$\omega 9=v/r9 \qquad (31)$$

$$d9=(1/G0) \cdot \omega 9+(1/G0) \cdot Tr \cdot (d\omega 9/dt) \qquad (32)$$

The program completes processing in S130 or S131, and advances to S132. The signal is output to the electric power steering control device 11, and the vehicle 1 is guided by realizing the target actual steering angle d9 calculated in S130 or S131 by the known PID control or the like using the output signal from the steering wheel angle sensor 8 as the feedback value.

Then, the program advances to S133, and it is determined whether or not the front end (the side wall) of the obstacle is recognized. If recognized, processing from S127 is repeated. If not recognized, the program is exited.

As described above, according to the embodiment of the present invention, Point P7 is the avoidance traveling reaching point, Points P2 and P5 are avoidance traveling target points, and Point P9 is the final avoidance target point.

Figure 6:
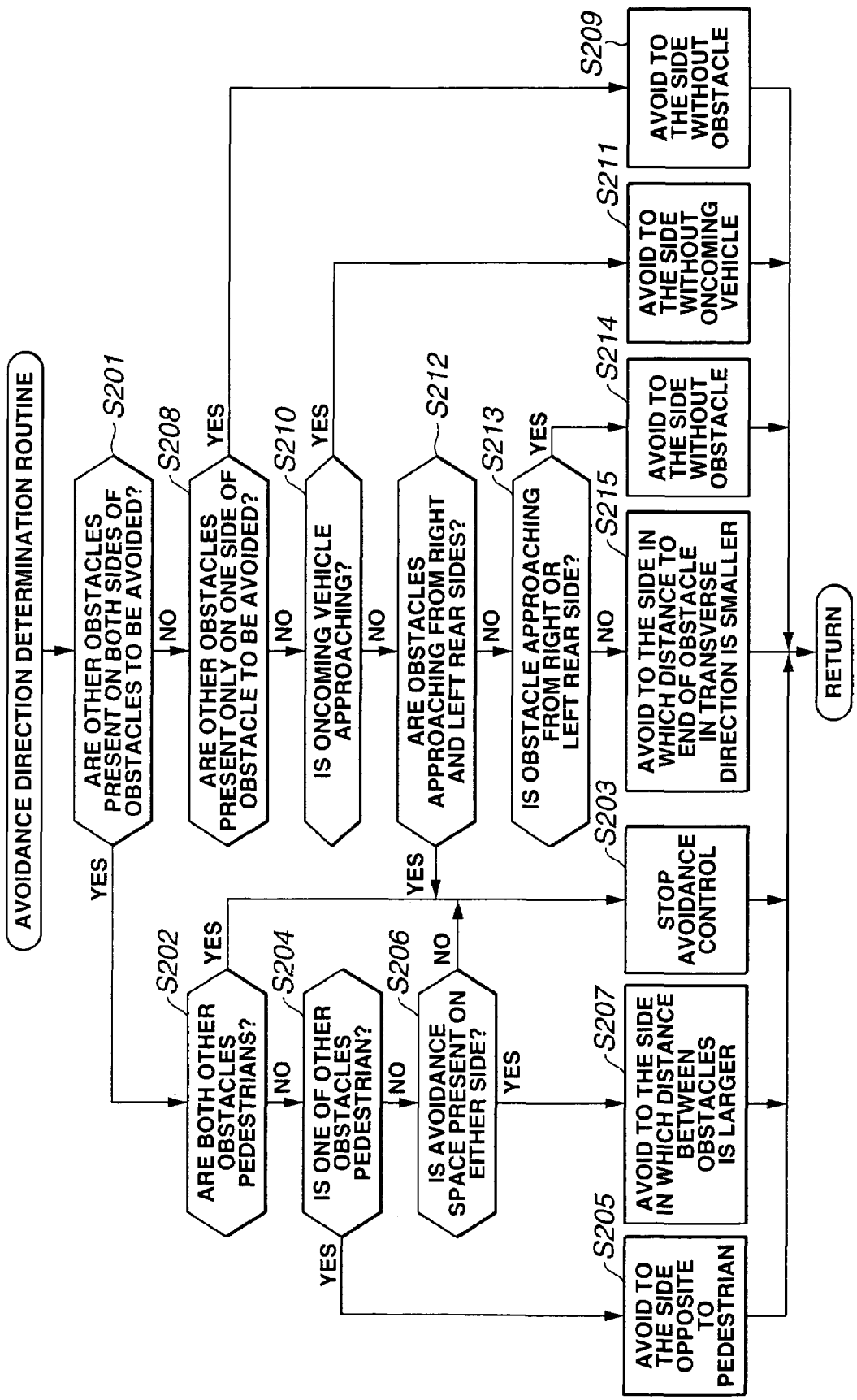
FIG. 6 is the flowchart of an avoiding direction determination routine.

Next, FIG. 6 shows the flowchart of the avoiding direction determination routine executed in S102 above. Firstly, in S201, it is determined whether or not other obstacles are present on both sides of the obstacle to be avoided. As a result of determination, if obstacles are present, execute the processing in S202 to S207. If no obstacles are present, execute the processing in S208 to S215.

As a result of determination of S201, if it is determined that other obstacles are present on both sides of the obstacle to be avoided, the program advances to S202, and it is determined whether or not the other obstacles than the obstacle to be avoided are both pedestrians. As a result of this determination, if it is determined that pedestrians are present on both sides, the program advances to S203, determines the stop of avoidance control, and exits the routine. On the other hand, if it is determined that pedestrians are not present on both sides, the program advances to S204.

In S204, it is determined whether or not one of the other obstacles than the obstacle to be avoided is a pedestrian. As a result of the determination, if it is determined that one of the other obstacles is a pedestrian, the program advances to S205, sets an avoidance path in the direction opposite to the side on which the pedestrian is present, and exits the routine.

As a result of the determination in S204, if it is determined that one of the other obstacles is not a pedestrian, the program advances to S206, and determines on which side an avoidance space is present. As a result of this determination in S206, if it is determined that no avoidance spaces are present on either side, the program advances to S203, determines the stop of avoidance control, and exits the routine. On the other hand, if an avoidance space is present on either side, the program advances to S207, determines that avoidance is performed to the side with a larger obstacle-to-obstacle distance between the obstacle to be avoided and the other obstacle, and exits the routine.

On the other hand, in S201, if it is determined no other obstacles are present on both sides of the obstacle to be avoided, the program advances to S208, and it is determined whether or not the other obstacle is present only on one side of the obstacle to be avoided.

As a result of the determination in S208, if it is determined that the other obstacle is present only on one side of the obstacle to be avoided, the program advances to S209, determines avoidance to the side on which no other obstacle is present, and exits the routine.

On the other hand, as a result of the determination in S208, if it is determined that no other obstacle is present on one side of the obstacle to be avoided, the program advances to S210, and it is determined whether or not an oncoming vehicle is approaching one side of the obstacle to be avoided.

As a result of the determination in S210, if it is determined that the oncoming vehicle is approaching, the program advances to S211, determines avoidance to the side on which no oncoming vehicle is present, and exits the routine.

On the other hand, as a result of the determination in S210, it is determined that no oncoming vehicle is approaching, the program advances to S212, and it is determined whether or not obstacles are approaching from right and left sides at the rear of the vehicle 1. As a result of the determination, if it is determined that the obstacles are approaching from the right and left sides at the rear of the vehicle 1, the program advances to S203, determines the stop of avoidance control, and exits the routine. In addition, if it is determined that no obstacles are approaching from right and left sides at the rear of the vehicle 1, the program advances to S213.

In S213, it is determined whether or not the obstacle is approaching from either of right and left sides at the rear of the vehicle 1. As a result of the determination, if it is determined the obstacle is approaching from either of right and left sides at the rear of the vehicle 1, the program advances to S214, determines avoidance to the side on which no obstacle is present, and exits the routine.

Further, if it is determined that no obstacle is approaching from either of the right and left sides at the rear of the vehicle 1, the program advances to S215, determines avoidance to a side in which the transverse distance between the obstacle end point and the vehicle 1 is smaller, and exits the routine.

As described above, according to the embodiment of the present invention, the target passing position includes only the avoidance traveling reaching point P7 of the obstacle to be avoided, the avoidance traveling target points P2 and P5, and the final avoidance target point P9, the vehicle is guided based on the target actual steering angle which is the vehicle motion parameter obtained according to the vehicle motion model with the target passing position as a target, and the obstacle can be smoothly, efficiently and stably avoided based on the actual behavior of the vehicle while controlling the increase of the number of operations to a minimum.

Next, avoidance traveling is described when the avoidance traveling target point P5 is at the target passing position, and the obstacle is a mobile three-dimensional object.

As described in the above embodiment, the position of the vehicle 1 during the avoidance traveling with the avoidance traveling target point P5 as the target passing position is estimated by calculating the position of the vehicle 1 in the absolute coordinates from the position of the obstacle obtained with the avoidance traveling start time as a reference, obstacle position information obtained during the avoidance traveling, and the yaw angle of the vehicle 1 calculated by integrating the yaw rate (dθ/dt) from the yaw rate sensor 9. If the obstacle moves, the control device 3 does not recognize that the obstacle is moving, but recognizes that the positional coordinates of the obstacle in the absolute coordinate system are matched with the positional coordinates of the obstacle obtained during the avoidance traveling. Therefore, the position of the vehicle 1 is estimated as the position in the absolute coordinate system while maintaining the positional relationship with the obstacle. Thus, the position of the obstacle and the position of the vehicle 1 are estimated to the positions different from the actual positions by the movement of the obstacle. By setting the avoidance traveling target point P5 at the target passing position by the estimated position of the vehicle 1, obstacle position information used for estimating the position of the vehicle 1, and the calculated yaw angle, the avoidance traveling target point P5 in the absolute coordinate system is set to the position different by the movement of the obstacle similar to the estimated position of the vehicle 1, and the control device 3 can guide the vehicle 1 with the avoidance traveling target point P5 as the target passing position. Even if the obstacle is a mobile three-dimensional object, the actual obstacle position or the actual position of the vehicle 1 need not be calculated by detecting the movement or the like of the obstacle. As described above, even if the obstacle is a mobile three-dimensional object, the position of the avoidance traveling target point P5 with respect to the vehicle 1 is adequately set according to obstacle position information obtained during the avoidance traveling, and the vehicle 1 can be guided.

In addition, even when performing the avoidance traveling with the avoidance traveling reaching point or the final avoidance target point as the target passing position, the target passing position is adequately set according to obstacle position information obtained during the avoidance traveling, and the vehicle 1 can be guided even if the obstacle is a mobile three-dimensional object.

In the embodiment of the present invention, the laser radar device 6 is used to detect approach of the obstacles from right and left sides at the rear of the vehicle 1. However, the invention is not limited thereto, and approach may be detected by information obtained from a CCD camera or an infrastructure facing backwardly.

Further, according to the embodiment of the present invention, the center of the pair of stereo cameras 4 is set to be the center of the coordinate system to perform each operation. However, the control value of more excellent accuracy can be obtained if each operation is performed by adding the distance from the position of the center of gravity to the center of the pair of stereo cameras 4 to each coordinate value considering the positional deviation to the center of gravity of the vehicle 1.

Still further, transition from the recognizing state of the obstacle to the non-recognizing state, or transition from the non-recognizing state to the recognizing state can be reliably performed if determination is performed by continuous several frames (for example, three frames) of the obtained images.

As described above, according to the present invention, the obstacle can be smoothly, efficiently and stably avoided based on the actual behavior of the vehicle while keeping an increase in the number of operations to a minimum.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A vehicle traveling control device comprising:
   object detection means for detecting an object in a traveling environment;
   obstacle recognition means for recognizing an obstacle to form a traveling obstacle of the vehicle from the object detected by the object detection means; and
   control means for guiding the vehicle so as to turnably avoid the obstacle recognized by the obstacle recognition means,
   wherein the control means:
      sets an avoidance traveling start point to start the avoidance traveling, an avoidance traveling reaching point on the obstacle side based on the position of the obstacle, and an avoidance traveling target point between the avoidance traveling start point and the avoidance traveling reaching point;
      sets vehicle motion parameters based on a vehicle motion model with the avoidance traveling target point and the avoidance traveling reaching point as target passing positions; and
      guides the vehicle so that the turning direction of the vehicle is switched to the opposite direction at the avoidance traveling target point with respect to the turning direction of the vehicle from the avoidance traveling start point to the avoidance traveling target point.

2. The vehicle traveling control device according to claim 1, wherein the control means sets a final avoidance target point to avoid the obstacle, sets vehicle motion parameters based on a vehicle motion model with the final avoidance target point as a target passing position, and guides the vehicle to the target passing position.

3. The vehicle traveling control device according to claim 1, wherein the control means:
   estimates a present position of the vehicle based on positional information of the obstacle obtained with the avoidance traveling start point as a reference, presently obtained positional information of the obstacle from the obstacle recognition means, and the state of the motion of the vehicle when the vehicle is guided with the avoidance traveling target point as the target passing position;
   estimates a new avoidance traveling target point by the avoidance traveling target point set with the avoidance traveling start point as a reference, the present position of the vehicle, and the state of the motion of the vehicle; and
   sets the new avoidance traveling target point to be at the target passing position.

4. The vehicle traveling control device according to claim 2, wherein the control means:
   estimates a present position of the vehicle based on positional information of the obstacle obtained with the avoidance traveling start point as a reference, presently obtained positional information of the obstacle from the obstacle recognition means, and the state of the motion of the vehicle when the vehicle is guided with the avoidance traveling target point as the target avoidance position;

estimates a new avoidance traveling target point by the avoidance traveling target point set with the avoidance traveling start point as a reference, the present position of the vehicle, and the state of the motion of the vehicle; and sets the new avoidance traveling target point to be at the target passing position.

5. The vehicle traveling control device according to claim 1, wherein the avoidance traveling reaching point is set based on positional information of the obstacle from the obstacle recognition means obtained when guiding the vehicle and the state of the motion of the vehicle.

6. The vehicle traveling control device according to claim 4, wherein the avoidance traveling reaching point is set based on positional information of the obstacle from the obstacle recognition means obtained when guiding the vehicle and the state of the motion of the vehicle.

7. The vehicle traveling control device according to claim 1, wherein the control means sets a steering angle to be substantially zero when the transverse deviation between the target passing position and the position of the vehicle does not exceed a preset value.

8. The vehicle traveling control device according to claim 4, wherein the control means sets a steering angle to be substantially zero when the transverse deviation between the target passing position and the position of the vehicle does not exceed a preset value.

9. The vehicle traveling control device according to claim 1, wherein the control means cancels the guiding of the vehicle if the object detection means detects that pedestrians are present on both sides of the obstacle.

10. The vehicle traveling control device according to claim 4, wherein the control means cancels the guiding of the vehicle if the object detection means detects that pedestrians are present on both sides of the obstacle.

11. The vehicle traveling control device according to claim 1, wherein the control means guides the vehicle to the side on which no pedestrian is present if the object detection means detects that a pedestrian is present on one side of the obstacle.

12. The vehicle traveling control device according to claim 4, wherein the control means guides the vehicle to the side on which no pedestrian is present if the object detection means detects that a pedestrian is present on one side of the obstacle.

13. The vehicle traveling control device according to claim 1, wherein the control means guides the vehicle to the side on which no oncoming vehicle is present if the object detection means detects the oncoming vehicle on either side of the obstacle.

14. The vehicle traveling control device according to claim 4, wherein the control means guides the vehicle to the side on which no oncoming vehicle is present if the object detection means detects the oncoming vehicle on either side of the obstacle.

15. The vehicle traveling control device according to claim 1, wherein the control means cancels the guiding of the vehicle if the object detection means detects a second obstacle different from the obstacle approaches from both sides at the rear of the vehicle.

16. The vehicle traveling control device according to claim 4, wherein the control means cancels the guiding of the vehicle if the object detection means detects a second obstacle different from the obstacle approaches from both sides at the rear of the vehicle.

17. The vehicle traveling control device according to claim 1, wherein the control means guides the vehicle to the side on which a second obstacle does not approach if the object detection means detects the second obstacle different from the obstacle approaches from either backward side of the vehicle.

18. The vehicle traveling control device according to claim 4, wherein the control means guides the vehicle to the side on which a second obstacle does not approach if the object detection means detects the second obstacle different from the obstacle approaches from either backward side of the vehicle.

* * * * *